Patented Nov. 8, 1949

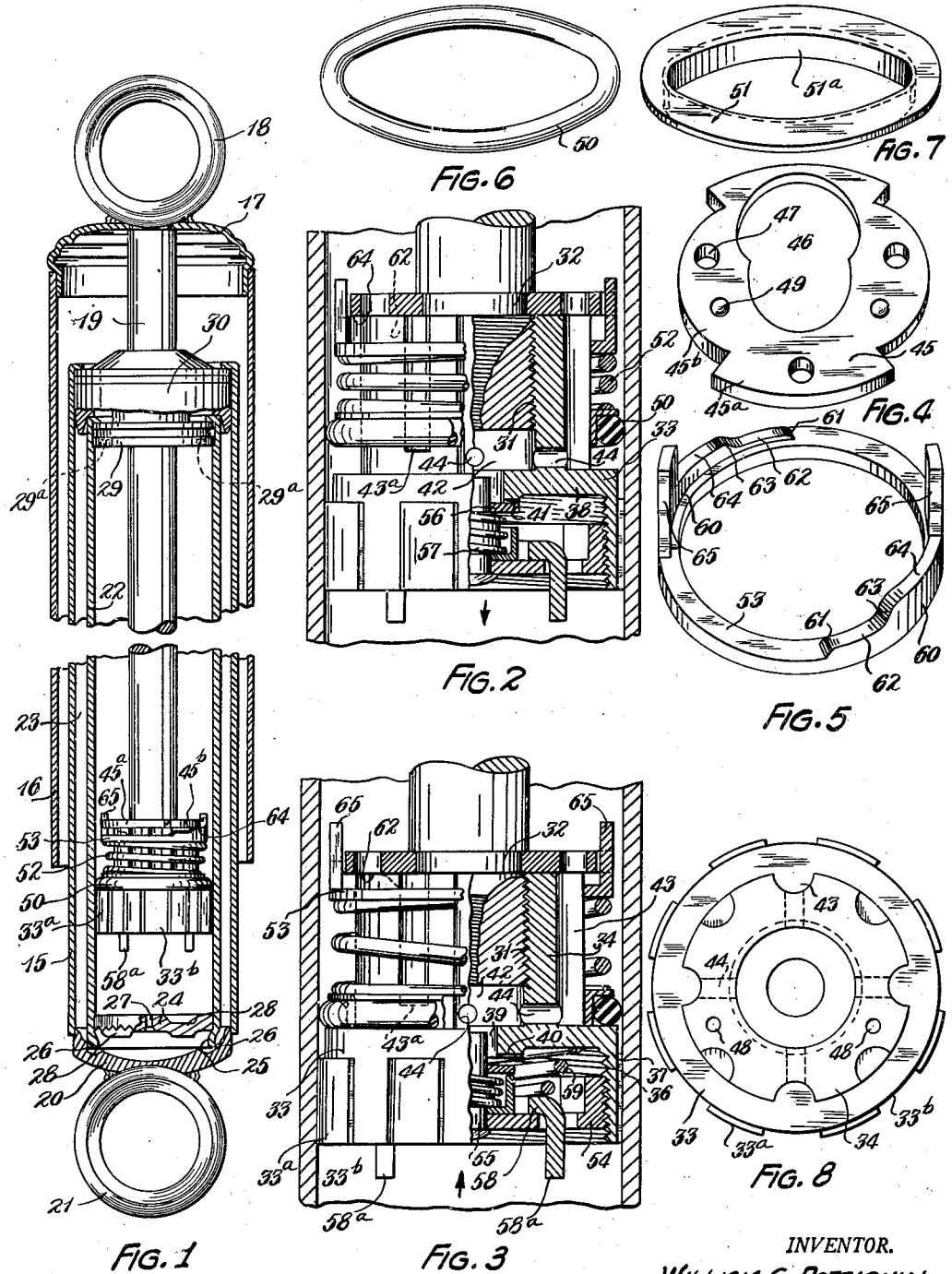

2,487,472

UNITED STATES PATENT OFFICE 2,487,472

SHOCK ABSORBER

William G. Patriquin, Cleveland, Ohio, assignor to The Gabriel Company, Cleveland, Ohio, a corporation of Ohio Application May 28, 1947, Serial No. 750,902

5 Claims. (Cl. 188—88)

This invention relates to a shock absorber and particularly to a fluid shock absorber. Although the invention is applicable to various types of fluid shock absorbers it is illustrated and explained herein by way of example as embodied in a direct double acting tubular telescopic hydraulic shock absorber.

An object of the invention is to provide in a fluid shock absorber of the type specified, improved and novel means for adjusting the operating characteristics of the valve or valves carried by the piston of the shock absorber to thus enable the shock absorber to function properly and in the desired manner.

Another object of the invention is to provide a shock absorber such as referred to in the last named object and wherein the adjustment of the valve or valves carried by the piston can be obtained without disassembly of the shock absorber.

A further object of the invention is to provide in a fluid shock absorber of the type having a piston reciprocable in a working cylinder, means preventing the passage of fluid from one side of the piston to the other side thereof during one piston stroke until a predetermined pressure has been developed on said one side of the piston whereupon said means functions to allow, during the remainder of the piston stroke and the existence of said predetermined pressure, the passage of fluid from said one side of the piston to said other side thereof and wherein provision is made for varying selectively the predetermined pressure required before the fluid can pass from said one side to said other side of the piston as aforesaid.

Another object of the invention is to provide a shock absorber which is an improvement on the shock absorbers shown in E. L. Beecher Patents Nos. 2,394,356, issued February 5, 1946, and 2,396,227, issued March 12, 1946, in that the shiftable packing ring carried by the piston and performing the dual function of a piston packing and a valve is held in seated position by a spring, the tension of which can be adjusted to vary the predetermined pressure required on the impact stroke of the shock absorber to move said ring against the action of said spring.

A further object is to provide a shock absorber as provided in the last named object and wherein the adjustment of said spring tension is accomplished without disassembling the shock absorber and by extending the cylinder and piston rod relative to each other and then relatively rotating the same.

A still further object is to provide a shock absorber as specified in the last named object and wherein the adjustment imparted to the spring tension is maintained against accidental variance by the force of the spring itself.

A still further object is to provide in a fluid shock absorber of the direct double acting tubular telescoping type the combination of means for adjusting the piston carried valves which control the passage of fluid from one side of the piston to the other side thereof during both impact and recoil strokes and wherein the adjustments are obtainable without disassembling the shock absorber.

A more specific object is to provide a shock absorber such as referred to in the last named object and wherein the valve which controls the passage of fluid past or through the piston on the impact stroke can be adjusted by relatively extending the cylinder and piston rod and then relatively turning the same while the valve which controls the passage of fluid through or past the piston on the recoil stroke can be adjusted by relatively collapsing the cylinder and piston rod and then relatively turning the same.

A more general object of the invention is to provide a fluid shock absorber of the direct double acting tubular telescopic type which embodies means for varying the operative characteristics of the shock absorber upon both the impact and recoil strokes thereby furnishing a shock absorber which has a wide range of utility and is adapted to provide the desired riding qualities for the different vehicles on which the shock absorber may be mounted.

Further and additional objects and advantages not hereinbefore referred to will become apparent hereinafter during the detailed description of an embodiment of the invention which is to follow.

Referring to the accompanying drawing illustrating said embodiment of the invention;

Fig. 1 is a longitudinal sectional view through a direct double acting hydraulic tubular telescopic shock absorber with certain of the parts including the piston and piston rod shown in elevation.

Fig. 2 is a fragmentary partly elevational and partly sectional view on a larger scale than Fig. 1 and shows the details of the piston construction with the parts being indicated in the relationship they may assume during the impact or compression stroke of the shock absorber (the down stroke of the piston in the cylinder), the adjustment of the O-ring spring tension being indicated as maximum.

Fig. 3 is a view similar to Fig. 2 but shows the relationship which the parts may have during the recoil stroke of the shock absorber (the up stroke of the piston in the cylinder), the adjustment of the O-ring spring tension being indicated as intermediate maximum and minimum.

Fig. 4 is a detail view of the stop plate employed in the piston construction as an abutment for the coil spring which acts against the O-ring carried by the piston.

Fig. 5 is a detail view of the impact adjusting member or annulus which is interposed between the stop plate and the spring that acts on the O-ring and which member functions in cooperation with said stop plate to adjust the tension of said spring.

Figs. 6 and 7 are detail views of the O-ring and the carrier therefor, and

Fig. 8 is an end view of the piston with the O-ring, its carrier, its spring, the impact adjusting member and the stop plate removed and is taken looking from the top side of the piston.

A shock absorber embodying the present invention is illustrated in the drawing and is by way of example a direct double acting hydraulic tubular telescopic shock absorber. This shock absorber comprises a substantially cylindrical casing 15 which has relative telescopic movement within a cylindrical guard housing 16 that is spaced radially outwardly from the casing 15. The upper end of the housing 16 is closed by an inverted cup-shaped closure or cap member 17 provided on its outer side with an eye 18 while the piston rod 19 is operatively connected to the member 17 and eye 18. The lower end of the casing 15 is closed by a cup-shaped closure member 20 which has secured to its outer side a lower eye 21. The closure members 17 and 20 extend into the housing 16 and the casing 15, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in parallel relationship and pass through the eyes 18 and 21. These pins or rods may be operatively connected within the eyes 18 and 21 by suitable means well known in the art, wherefore relative movement between the frame and axle of the vehicle will cause relative telescoping movement between the casing 15 and the housing 16 and relative movement of the piston rod 19 and the piston secured thereto and located in the pressure or working cylinder as will be well understood.

The pressure or working cylinder 22 of the shock absorber is disposed within the casing 15 in spaced concentric relationship therewith so that the space defined by the casing 15, cylinder 22, closure member 20 and a closure member for the upper end of the casing and cylinder, later to be referred to, constitutes a reservoir 23 for the oil or liquid or fluid in the shock absorber. The lower end of the cylinder 22 extends into the cup-shaped closure member 20 and is secured thereto by suitable means understood in the art. The cylinder 22 slightly upwardly of the lower end has secured therein a closure plate 24. The cylinder 22 below the closure plate 24 is provided with an inwardly extending bead 25 which serves to retain the closure plate in position while the cup-shaped closure member 20 is provided with a plurality of circumferentially spaced internal grooves or channels 26 which place the reservoir 23 in communication with the space between the closure plate 24 and the bottom of the cup-shaped closure member 20. The closure plate 24 is shown as provided with a fixed or constantly open orifice 27 which places the working cylinder in communication with the space below the plate 24 and with the reservoir 23. It will be understood that the plate 24 may be provided, if desired or necessary, with an opening closed by a replenishing valve during the impact stroke of the shock absorber but open during the recoil stroke of the shock absorber in order to facilitate the return flow of fluid from the reservoir into the working cylinder during the recoil stroke for a purpose well understood in the art and hence not shown herein. It will also be understood that the closure plate 24 might be provided with a valve controlling the orifice 27 and openable during the impact stroke of the piston. The closure plate 24 is also provided on its inner side with spaced depressions 28 for a purpose later to be explained.

The upper end of the cylinder 22 is closed by a plug member 29 which fits into the cylinder and is suitably secured in position therein, it being noted that the upper edge of the cylinder is turned inwardly over the outer side of the plug member. The plug member 29 is provided with a central opening or bore through which slidably extends the piston rod 19. In addition the plug member 29 on its under or inner side is provided with diametrically spaced depressions 29a for a purpose later to be explained. The construction of the plug member 29 other than in the particulars specifically referred to forms no part of the present invention and therefore further description of the same is unnecessary except to say that it tightly seals the upper end of the cylinder 22.

The upper end of the casing 15 is closed by a closure member 30 mounted in the casing and suitably connected thereto. The closure member 30 forms no part of the present invention and a detailed description thereof is unnecessary except to say that said member carries a suitable spring-pressed packing seal through which the piston rod 19 slidably extends.

The piston rod 19 at its inner end is externally threaded as indicated at 31, see Figs. 2 and 3, while just above the threads 31 the piston rod is provided with an annular recess or groove 32. The piston comprises a body which may be formed in various ways but preferably it is a die casting. The piston body includes a lower and larger portion 33 and an upper or reduced portion 34. The periphery of the lower portion of the piston body adjacent the upper end of the said portion is spaced from the cylinder wall while the remainder of the piston portion 33 is provided with circularly spaced axially extending lands 33a slidably engaging the cylinder wall and providing between the lands grooves or channels 33b spaced from the cylinder wall. In the present illustration eight lands 33a and eight grooves or depressions 33b are shown on the periphery of the lower portion 33 of the piston body.

The lower portion 33 of the piston body is provided with a counterbore 36, the wall of which is threaded as indicated at 37 for a purpose later to be explained. The inner end of the counterbore 36, that is the upper end of the portion 33 of the piston body, is separated from the upper reduced or smaller piston portion 34 by a wall 38 in the center of which is a bore 39 communicating with the counterbore 36 and with a larger central bore 42 formed in the upper portion 34 of the piston body. The wall 38 surrounding the bore 39 is provided with an annular recoil valve seat boss 40 projecting into the counterbore 36 and said boss may be provided with one or more radially extending angularly spaced bleed grooves or notches 41 for a purpose later to be explained.

The upper portion 34 of the piston body is provided with the previously referred to central bore 42 which is threaded so that the threaded end 31 of the piston rod 19 can be screwed into the bore 42 in uniting the piston body to the piston rod.

The upper portion 34 of the piston body is also provided radially outwardly of the bore 42 with a plurality of circularly spaced axially extending peripheral recesses or grooves 43, certain of which extend from the piston part 33 to the end of the piston part 34. The recesses 43 are substantially semi-circular in cross section and are angularly spaced circumferentially of the piston portion 34, there being eight such recesses illustrated herein. The recesses 43 can be die cast or otherwise formed in the piston body.

The piston portion 34 is provided with ports 44 that place the lower end of the bore 42 in communication with said certain of the recesses 43. It will be noted that in the illustration four such ports 44 are shown and hence alternate recesses 43 are in communication with the bore 42 while the remaining recesses 43 are not in communication therewith and terminate short of the piston portion 33 as indicated at 43a in Figs. 2 and 3.

A spring abutment plate or washer 45 is provided with an opening 46 similar to a bayonet slot, wherefore the piston rod 19 can be passed through the enlarged part of said opening 46 and then the washer can be moved transversely relative to the piston rod to bring said rod into the smaller part of the slot 46 with the edge of said smaller part engaging in the annular groove 32 of the piston rod and with the plate 45 engaging the end of the piston portion 34 and with said plate forming an assembly abutment for the piston body.

The large part of the bayonet slot 46 in the washer 45 overlies several of the recesses 43 and the plate is provided with a plurality of openings 47 which overlie other of the recesses 43. The upper portion 34 of the piston body is provided with one or more axially extending lugs or pins 48 which when the parts are assembled engage in openings 49 in the plate 45 and act to hold said plate against movement relative to the piston body. The plate 45 is provided with diametrically disposed segmental portions 45a, the diameter of which is substantially equal to a diameter of the piston portion 33 taken through diametrically disposed grooves 33b. Intermediate the portions 45a are diametrically disposed recessed segmental portions 45b, the radius of which is such that substantial clearance exists between the portions 45b and the cylinder wall.

A flexible packing and valve ring 50 of normally circular cross section and formed of any suitable material such as synthetic rubber for example, is movably mounted on the upper piston portion 34 and is shown as mounted on a movable carrier 51 which is slidable on said upper portion of the piston body. The carrier 51 is in the form of a ring of angular cross-section having an arm 51a that extends longitudinally or axially of the piston and which contacts the piston portion 34 and slides therealong and a radially extending arm which overlies the upper side of the ring 50 as viewed in the drawing. It will thus be seen that the ring 50 and the carrier 51 may move toward and away from the piston portion 33 upon changes in direction of piston movement and that when the ring 50 is in the position shown in Fig. 3 it acts not only as a piston packing but also as a valve to close the spaces between the piston portion 33 and the cylinder wall while in the position indicated in Fig. 2 said spaces are open and are in communication with the recesses 43 of the upper portion of the piston. The ring 50, as stated, has the combined function of a packing ring and a valve. A coil spring 52 is interposed between the radial arm of the ring 51 and a spring adjustment annulus or member 53 slidable on the piston portion 34 and engaging with the abutment plate 45. The spring adjustment annulus 53 will be referred to hereinafter in greater detail as to its structure and its function. For the present it will suffice to say that the spring 52 is of such strength as to normally maintain the ring 50 seated as indicated in Fig. 3.

A cup-shaped member 54 is screwed into the counterbore 36 in the lower portion 33 of the piston body and said member has secured rigidly and centrally thereof a stud 55 which projects upwardly into the bore 39. A flat disk recoil valve 56 is slidable on the stud 55 and said valve is held normally against the valve seat boss 40 by a coil spring 57 mounted on the stud 55 and contained within a small cup retainer also mounted thereon and said spring bears against the bottom of said retainer. A member 58 is mounted within the cup-shaped member 54 and is held against said cup-shaped member by a large coil spring 59 which also acts to lock the cup-shaped member 54 in adjusted position. The member 58 has projections 58a which extend through openings in the cup-shaped member 54 and are adapted to cooperate with the recesses 28 of the closure plate 24 when the shock absorber is collapsed and the piston and cylinder relatively turned to effect an adjusting screwing in or out of the cup-shaped member 54 to vary the tension of the recoil valve spring 57 and the pressure required to unseat the recoil valve 56 during the recoil stroke of the piston.

The operation of the shock absorber as thus far described will now be explained. Assuming that the cylinder 22 is filled with suitable fluid as, for instance, oil and also that the reservoir 23 contains a suitable amount of the fluid, it will be seen that the reciprocation of the piston in the cylinder takes place within such fluid. It will be assumed that the spring 52 exerts a predetermined pressure on the ring 50 and acts to normally maintain said ring in the seated position of Fig. 3. Assuming that the piston is in its normal inactive position within the cylinder 22 and that the wheels of the vehicle upon which the shock absorber is mounted strike an obstacle and cause a compression of the vehicle springs, it will be understood that the piston moves downwardly in the cylinder under the impact. During this impact or downward movement of the piston the ring 50 is in the position shown in Fig. 3 until the predetermined pressure of the spring 52 is overcome by the pressure of the fluid on the lower side of the piston. Until this occurs no fluid flows from the underside of the piston to the upper side thereof during the impact stroke, except such as may bleed through the passages 41 in the valve seat 40. Therefore the volumetric capacity of the chamber above the piston increases more rapidly than the volumetric area thereof occupied by the inwardly moving piston rod. Hence the fluid pressure below the piston rapidly builds up to a positive pressure while the fluid pressure above the piston rapidly attains a zero or negative pressure. During this impact stroke the fluid below the piston can only flow from the cylinder to the reservoir through the orifice 27 in the closure plate 24 or through an impact valve carried by said plate, if the shock absorber employs such valve, until near the end of the impact stroke when the fluid pressure below the piston overcomes the action of the spring 52. When this latter condition occurs the ring 50 will be moved away from the piston portion 33 and thereupon fluid can flow through the passage 33b on the periphery of the piston portion 33 and through the recesses or passages 43 of the piston portion 34 to the upper side of the piston to tend to bring the pressure on opposite sides of the piston into equilibrium and until the pressure below the piston is insufficient to maintain the ring 50 unseated against the action of the spring 52. Ordinarily the ring 50 will remain seated during the impact stroke, particularly if such impact stroke is a short one and in any event it will only be moved against the action of its spring 52 near the end of the impact stroke. Of course the predetermined pressure below the piston required to move the ring 50 to unseated position depends upon the strength of the spring 52. When the compressed vehicle springs expand the piston moves upwardly in the cylinder in its recoil stroke. Immediately upon this recoil movement of the piston the ring 50 is seated, as indicated in Fig. 3, if it is not already in such position, and hence fluid cannot flow from the upper side of the piston to the underside thereof until the recoil valve 56 moves off its seat 40 against the action of its spring 57. During the upward movement of the piston in its recoil stroke the volume of the piston rod within the cylinder constantly decreases as does also the volume of the cylinder above the piston. During the upward or recoil stroke of the piston the fluid is drawn from the reservoir into the cylinder below the piston through the orifice 27 in the plate 24 and preferably through a replenishing valve also carried by said plate. As soon as the pressure on the valve 56 attains to a predetermined amount during the recoil stroke said valve moves off its seat 40 against the action of its spring 57, whereupon fluid is free to flow from the upper side of the piston to the lower side thereof through the passages or recesses 43, ports 44, bore 42, bore 39 and counterbore 36.

As already explained, the spring 52 abuts against the spring adjusting annulus 53 that is slidable on the piston portion 34 and is in contact with the plate 45. In order to adjust the tension of the spring 52 to vary the predetermined pressure required to unseat the ring 50 during the impact stroke and thus to attain various operating characteristics for the shock absorber, the ring 53 is provided on its upper flat side at diametrically disposed locations near its circumference with upstanding walls 60 arranged when the flat upper side of the annulus 53 is in contact with the under side of the plate 45 to be within the recesses between the segmental portions 45a of the plate 45 and to lie radially outwardly of the segmental portions 45b and be in contact therewith.

The upper edges of the walls 60 of the annulus 53 are in the form of camming surfaces consisting of rising portions 61 extending from the upper flat surface of the annulus 53, land portions 62 from which rising portions 63 extend into land portions 64 adjacent to upwardly extending lugs 65.

It will be seen that when the annulus 53 is arranged relative to the plate 45 to have its flat upper surface in contact with the flat under surface of the plate the lugs 65 engage the ends of the portions 45a of the plate. It will further be seen that when the annulus 53 is rotated relative to the plate 45 in a direction to move the lugs 65 away from the portions 45a of the plate 45, then the rising portions 61 engaging with the underside of the portions 45a of the plate 45 cause the annulus 53 to move axially relative to the plate until the land portions 62 are in engagement with the underside of the portions 45a of the plate 45. This relative axial movement of the ring 53 results in moving said annulus slightly toward the piston portion 33. Continuation of such relative rotative movement of the annulus 53 will cause the rising portions 63 to engage with the underside of the portions 45a of the plate 45 and cause still further relative axial movement of the annulus 53 toward the piston portion 33 until the lands 64 are engaging with the underside of the portions 45a of the plate, at which time the annulus 53 will have moved still farther toward the piston portion 33 while the lugs 65 will engage with the ends of the portions 45a of the plate opposite to the ends thereof with which they were first engaged. Consequently the annulus 53 can be adjusted to three different positions relative to the plate 45, namely, a position wherein the flat upper surface of the annulus 53 contacts the underside of the portions 45a, a position wherein the lands 62 contact the under side of such portions or a position wherein the lands 64 contact the underside of said portions. Hence, in the form illustrated, three different adjustments can be imparted to the tension of the spring 52 by adjusting the annulus 53 relative to the plate 45. It will be understood that although three different adjustments have been illustrated and described this number could be varied as desired and within the concept of the invention.

It will be noted that the spring 52 functions to hold the annulus 53 in its various adjusted positions relative to the plate. In order to adjust the annulus 53 relative to the plate 45 without disassembling the shock absorber the piston can be extended to its most upward position in the cylinder 22 to engage the lugs 65 with the depressions 29a in the underside of the plug 29, whereupon relative rotation between the piston rod and the cylinder 22 will effect the relative adjusting rotation of the annulus 53 with respect to the plate 45.

Consequently the shock absorber embodying the present invention can without disassembly be adjusted to vary the tension of the spring 52 and the predetermined pressure required to move the packing ring 50 against the action of said spring 52 during the impact stroke. Therefore the operating characteristics of the shock absorber on the impact stroke can be varied to meet conditions peculiar to a particular installation.

Also by collapsing the shock absorber to engage the lugs 58a in the depressions 28 of the closure plate 24 and relatively rotating the cylinder and piston the tension of the spring 57 of the recoil valve 56 can be adjusted to vary the predetermined pressure required to unseat said valve during the recoil stroke of the piston. Hence the operating characteristics of the shock absorber on the recoil stroke can be varied to meet the particular requirements of an installation without disassembling the shock absorber.

It will thus be seen that the shock absorber embodying the present invention can have its operating characteristics for either the impact stroke or the recoil stroke or both strokes readily adjusted without disassembly of the shock absorber, the adjustment for the impact stroke being accomplished by completely extending the shock absorber and relatively turning the piston rod and cylinder and for the recoil stroke by completely collapsing the shock absorber and relatively turning the piston rod and piston.

Consequently a shock absorber embodying the present invention possesses the important advantage of being adapted for various types of installations and capable of providing a wide range of shock absorber characteristics.

It will be noted that should the shock absorber become completely extended under a severe impact to cause the lugs to engage the plug 29 no damage will occur to said lugs since the annulus 53 can move against the spring 52 and in fact said spring 52 will act to cushion any such "bottoming" of the lugs 65 with respect to the plug 29.

Although a preferred embodiment of the invention has been illustrated and described herein it will be understood that the invention is susceptible of various modifications and adaptations within the scope of the appended claims.

Having thus described my invention, I claim:

1. In a fluid shock absorber, a cylinder, a piston movable therein in opposite directions during the impact and recoil strokes and having a larger portion slidable in said cylinder and provided with peripheral passages extending from end to end of said portion, said piston having a smaller portion radially spaced from said cylinder, a resilient packing ring mounted on said smaller portion of said piston and engaging said cylinder and movable relative to said smaller portion to a passage closing position in engagement with an end of said larger portion during the recoil stroke and from said position during impact stroke, spring means acting on said ring to maintain it in passage closing position during the impact stroke until the creation of a predetermined fluid pressure, means carried by said piston for adjusting said spring means to vary said required predetermined pressure to provide the desired operative characteristics of the shock absorber during its impact stroke, said adjusting means including a fixed member operatively associated with the smaller portion of said piston, and a movable member carried by said smaller portion and relatively rotatable and axially movable with respect to said fixed member, said movable member engaging said spring means and being provided with camming surfaces and lands which contact said fixed member and act when said members are relatively rotated to effect relative axial movement therebetween.

2. In a fluid shock absorber, a cylinder, a piston movable therein in opposite directions during the impact and recoil strokes and having a larger portion slidable in said cylinder and provided with peripheral passages extending from end to end of said portion, said piston having a smaller portion radially spaced from said cylinder, a resilient packing ring mounted on said smaller portion of said piston and engaging said cylinder and movable relative to said smaller portion to a passage closing position in engagement with an end of said larger portion during the recoil stroke and from said position during impact stroke, spring means acting on said ring to maintain it in passage closing position during the impact stroke until the creation of a predetermined fluid pressure, means carried by said piston for adjusting said spring means to vary said required predetermined pressure to provide the desired operative characteristics of the shock absorber during its impact stroke, said adjusting means including a fixed member operatively associated with the smaller portion of said piston, and a movable member carried by said smaller portion and relatively rotatable and axially movable with respect to said fixed member, said fixed member being in the form of a plate having at diametrically opposite points in its periphery arcuate recesses, said movable member being in the form of a flat annulus provided at diametrically opposite points adjacent its outer circumference with upstanding arcuate walls located when the upper side of said annulus is in contact with said plate in said arcuate recesses thereof, said walls having their upper edges in the form of rising portions and land portions which when said members are relatively rotated contact the underside of said plate and cause said members to be axially displaced relative to each other, said movable member contacting said spring means.

3. A shock absorber as defined in claim 2 and wherein said walls are provided with upstanding lugs while one end of said cylinder is provided with recesses engaging and cooperating with said lugs when said piston and cylinder are extended and relatively rotated to effect relative rotation and axial movement between said members to adjust said spring means.

4. In a fluid shock absorber having a cylinder, a piston movable therein in opposite directions during the impact and recoil strokes and having a larger portion slidable in said cylinder and provided with peripheral passages extending from end to end of said portion, said piston having a smaller portion radially spaced from said cylinder, a resilient packing ring mounted on said smaller portion of said piston and engaging said cylinder and movable longitudinally relative to said smaller portion to a passage closing position in engagement with an end of said larger portion during the recoil stroke and from said position during impact stroke, a member fixed with respect to said piston and located adjacent to the free end of said smaller portion, and a spring reacting against said member and said ring to maintain the latter in passage closing position during the impact stroke until the creation of a predetermined fluid pressure; the improvement which comprises an adjustable movable member on said piston and interposed between said spring and said fixed member, said members having cooperating surface means acting on relative movement between said members to adjust the movable member to vary the load of said spring against said ring.

5. The improvement in a fluid shock absorber as defined in claim 4 and wherein said improvement further comprises a member on said piston and interposed between said spring and said fixed member and relatively rotatable and axially movable with respect to said fixed member, said members having cooperating surfaces acting upon relative rotation between the members to move the second member axially away from the fixed member and toward the larger portion of said piston and to maintain said fixed member in said axially moved position to vary the load of said spring against said ring.

WILLIAM G. PATRIQUIN.

REFERENCES CITED

The following references are of record in the file of this patent:

UNITED STATES PATENTS

| Number | Name | Date |
|---|---|---|
| Re. 21,908 | Beecher | Sept. 30, 1941 |
| 2,214,038 | Beecher | Sept. 10, 1940 |